(12) United States Patent
Lee et al.

(10) Patent No.: US 8,752,201 B2
(45) Date of Patent: Jun. 10, 2014

(54) APPARATUS AND METHOD FOR MANAGING DIGITAL RIGHTS THROUGH HOOKING A KERNEL NATIVE API

(75) Inventors: Ki-Hyung Lee, Yongin Si (KR); Gil Lee, Incheon (KR); Heoung-Keun Moon, Anyang Si (KR); Hwan-Woon Yeo, Hwaseong Si (KR); Hwang-Hoo Kim, Seoul (KR); Joon-Cheol Park, Yongin Si (KR); Jae-Hee Park, Busan (KR)

(73) Assignee: Samsung SDS Co., Ltd., Seoul (KR)

( * ) Notice: Subject to any disclaimer, the term of this patent is extended or adjusted under 35 U.S.C. 154(b) by 251 days.

(21) Appl. No.: 13/294,422

(22) Filed: Nov. 11, 2011

(65) Prior Publication Data

US 2012/0124675 A1    May 17, 2012

(30) Foreign Application Priority Data

Nov. 11, 2010  (KR) .................... 10-2010-0112146

(51) Int. Cl.
*G06F 21/00* (2013.01)
(52) U.S. Cl.
USPC .......................................................... 726/28
(58) Field of Classification Search
USPC .......................................................... 726/28
See application file for complete search history.

(56) References Cited

U.S. PATENT DOCUMENTS

| 7,484,103 | B2 * | 1/2009 | Woo et al. .................... 713/189 |
| 2003/0084281 | A1 | 5/2003 | Abiko et al. |
| 2005/0131832 | A1 * | 6/2005 | Fransdonk .................... 705/59 |
| 2008/0109362 | A1 * | 5/2008 | Fransdonk .................... 705/51 |

FOREIGN PATENT DOCUMENTS

| JP | 2005-353043 A | | 12/2005 |
| JP | 2009-110636 A | | 5/2009 |
| KR | 10-2009-0059694 | * | 6/2009 |
| KR | 10-2009-0059694 A | | 6/2009 |
| WO | 02/31632 A2 | | 4/2002 |
| WO | 03/058485 A1 | | 7/2003 |
| WO | 2009/093768 A1 | | 7/2009 |

OTHER PUBLICATIONS

Communication dated Aug. 14, 2013 issued by the European Patent Office in counterpart European Patent Application No. 11 18 8621.

* cited by examiner

*Primary Examiner* — Carl Colin
*Assistant Examiner* — Ali Shayanfar
(74) *Attorney, Agent, or Firm* — Sughrue Mion, PLLC

(57) ABSTRACT

Provided are an apparatus and method for managing digital rights. An agent unit manages application programs to which DRM is to be applied and rights to contents processed by the application programs to which DRM is to be applied, and encrypt and decrypt the contents processed by the application programs. A rights management unit authenticates a user and manages a user right to the contents processed by the application programs. A kernel API hooking unit monitors input/output of a file through hooking kernel native APIs, requests the rights management unit to verify the user right to the contents to be processed, and requests the agent unit to encrypt or decrypt the contents when the user right to the contents to be processed is verified.

16 Claims, 5 Drawing Sheets

APPARATUS AND METHOD FOR MANAGING DIGITAL RIGHTS THROUGH HOOKING A KERNEL NATIVE API

CROSS-REFERENCE TO RELATED APPLICATION

This application claims priority to Korean Patent Application No. 10-2010-0112146 filed on Nov. 11, 2010 and all the benefits accruing therefrom under 35 U.S.C. §119, the disclosure of which is incorporated herein by reference in its entirety.

BACKGROUND

The present invention relates to an apparatus and method for managing digital rights and, more particularly, to an apparatus and method for managing digital rights through hooking a kernel native API.

Digital Rights Management (DRM) is a technology for protecting various digital contents, such as e-book, music, video, game, software, stock information, image, and so on, from illegal duplication and for setting access rights to electronic documents for preventing leaks of information by insiders and outsiders. In past, most information leakage incidents are performed by hackers or viruses. However, in recent, as information leakage incidents have been caused for money by authorized insiders or related-parties, the voices of supplementing weak points inherent in existing security solutions are getting louder. Almost all documents of business entities are digitalized, and systems for sharing the digitalized documents are increasingly introduced. Thus, Enterprise DRM (E-DRM) is perceived as the most representative document security technology. The Enterprise DRM solution growing quickly domestically and abroad represents evolution to various technologies for meeting requirements of the current security market. Especially, the needs for new products applying these technologies increase in the markets requiring more enhanced information security solution. DRM solutions for directly encrypting contents which are containing core information and controlling the use of contents on the basis of the predefined right have a good position through core security infrastructures satisfying this market needs.

In typical DRM processing techniques, the DRM processing is implemented by a kernel driver or filter driver. Accordingly, the typical DRM processing techniques support only specific application programs in DRM processing of electronic documents or digitalized files, and thus additional DRM modules should be developed additionally, thereby additional developing time and cost are required. Also, the typical DRM processing techniques analyze specific application programs by using Reverse Engineering, and control and monitor specific messages, instructions and user interfaces (UIs) in the application programs by using the DLL (Dynamic Linking Library) injection method. In this case, the typical DRM processing techniques control DRM processing and manage digital rights through a kernel driver or filer driver.

However, there are following limitations in the typical DRM processing technique. First, since the DLL for the control of the corresponding application program should be developed on the basis of the analysis results of the specific application programs using reverse engineering, it takes long time in developing a new DLL. Thus, security issues may occur during the developing time. Second, modules which are injected to operate at the user level may conflict with other programs to make a stability problem. Third, in DRM processing by the kernel driver, conflicts with other kernel drivers or programs may arise and cause a system crash. Fourth, the flexibility is reduced because of developing the new kernel driver in changing the kernel or the operation system.

SUMMARY

The present invention is directed to providing an apparatus and method for managing digital rights which can perform DRM processing on new products or versions of all application programs and thus immediately respond to the leakage of electronic documents.

The present invention is also directed to providing a non-transitory computer readable medium recording a program for executing in a computer a method for managing digital rights which can perform DRM processing on new products or versions of all application programs and thus immediately cope with the leakage of electronic documents.

According to an aspect of the present invention, there is provided an apparatus for managing digital rights includes: an agent unit managing application programs to which DRM is to be applied and a right to contents processed by the application programs to which DRM is to be applied and encrypting or decrypting the content processed by the application programs to which DRM is to be applied; a rights management unit authenticating a user and managing a user right to the contents processed by the application programs to which DRM is to be applied; and a kernel API hooking unit monitoring input/output of a file through hooking of kernel native APIs, requesting the rights management unit to verify a user right to contents to be processed when the contents are detected as being processed by the application programs to which DRM is to be applied, and requesting the agent unit to encrypt or decrypt the contents to be processed when the user right to the contents to be processed is verified, wherein the agent unit, the rights management unit, and the kernel API hooking unit are driven for each application program to which DRM is to be applied.

According to another aspect of the present invention, there is provided a method for managing digital rights includes: (a) injecting a DRM engine module into an application program to which DRM is to be applied when the application program to which DRM is to be applied is driven; (b) monitoring input/output of a file through hooking a kernel native API, and when a content is detected as being processed by the application program to which DRM is to be applied, verifying a user right to the content to be processed in the application program to which DRM is to be applied; (c) selectively encrypting or decrypting the content to be processed when the user right to the content to be processed is verified; and (d) returning the encrypted or decrypted content to the kernel native API, wherein step (a) and step (c) are performed at user level, and step (b) and step (d) are performed at kernel level.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

An apparatus and method for managing digital rights according to an exemplary embodiment of the present invention should satisfy following requirements. First, the apparatus and method should include a DRM processing structure which can automatically apply DRM on the electronic files generated by all application programs. Second, the apparatus and method should immediately respond to new versions or products of the application program. Third, the apparatus and method should minimize the possibility of conflicts with other application programs or modules. Fourth, the apparatus and method should have enhanced availability and flexibility to be applied even when the operating program or the kernel is changed. Fifth, the apparatus and method should facilitate the addition or improvement of functions through simple module change.

Figure 1:
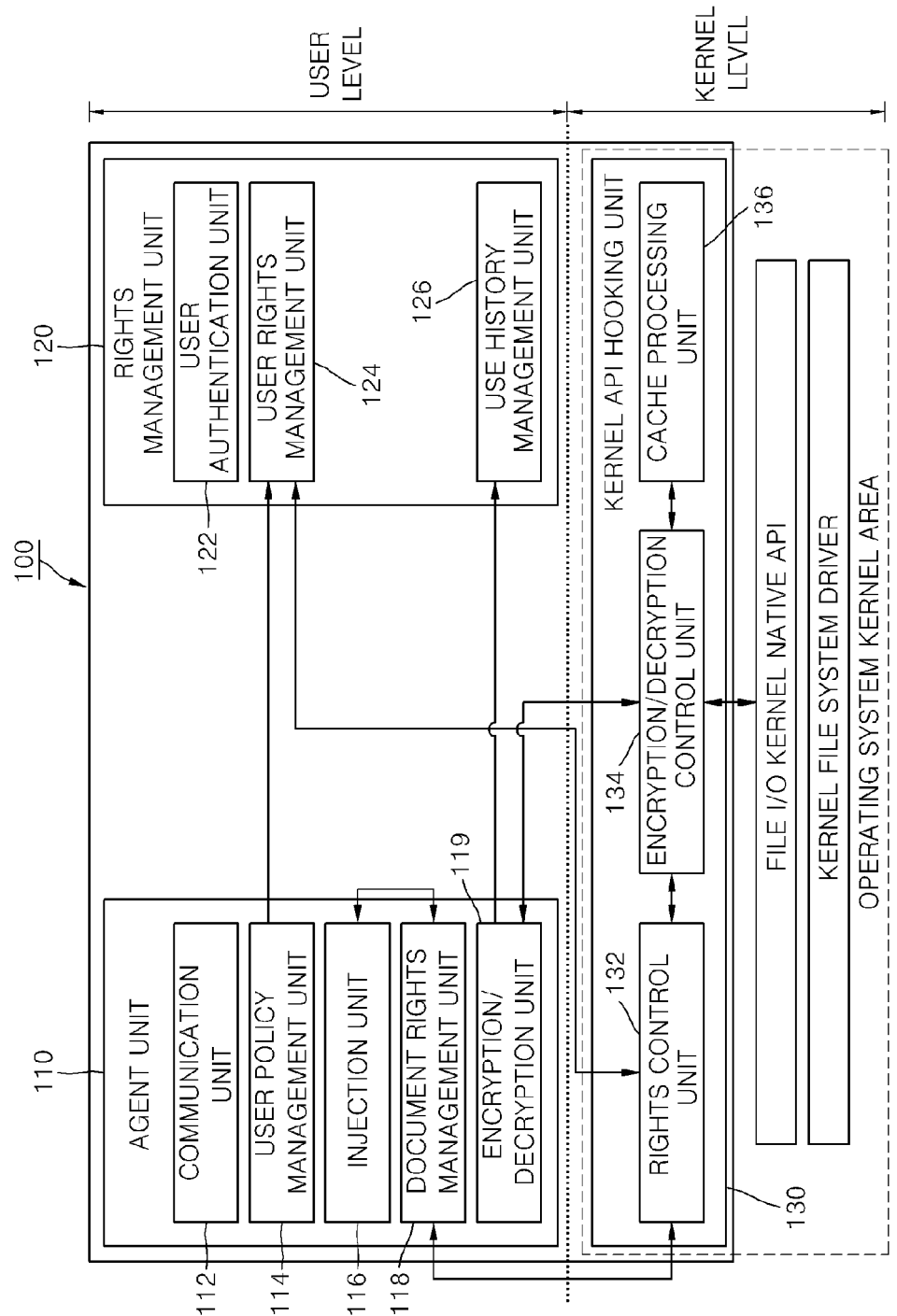
FIG. 1 is a block diagram showing a configuration of an apparatus for managing digital rights according to an exemplary embodiment of the present invention.

FIG. 1 is a block diagram showing a configuration of an apparatus for managing digital rights according to an exemplary embodiment of the present invention.

Referring to FIG. 1, an apparatus for managing digital rights 100 includes an agent unit 110, a rights management unit 120, and a kernel API hooking unit 130.

The agent unit 110 injects a DRM processing module into an application program for the control of the application program, manages rights to contents applied DRM (hereinafter, 'DRM content'), and encrypting/decrypting the DRM content. For this, the agent unit 110 includes a communication unit 112, a user policy management unit 114, an injection unit 116, a document rights management unit 118, and an encryption/decryption unit 119.

The communication unit 112 is an element for performing communication between the agent unit 110 and a management server (not shown) managing DRM policies, and transmits/receives the policies related with DRM to/from the management server. Then, the DRM policies received from the management server may include information for each application program or content, information on the application programs to which DRM is to be applied, and information on allowance/limitation/change of a user right. Accordingly, the specific application programs (for example, MS EXEL, MS WORD, etc.) are set to perform DRM processing through the DRM policies provided from the management server to the agent unit 110, and change or restrict access to specific documents by a specific user or user group. Furthermore, access rights of a user to a specific application program or content may be temporarily changed or restricted during a certain period. Like this, the DRM policies received from the management server is delivered to a document rights management unit 118 and rights management unit 120 depending on their attribute. In the following description, the content will be described using a document as an example, but includes a file with an electronic form, which is written for delivering information such as a video, picture, and web document.

The user policy management unit 114 performs a function of changing (that is, adding or deleting) user rights which are set to a user or a document. Accordingly, a user can change an access rights to a document within his/her rights. Furthermore, information on the user rights which is received from the management server may be reflected in DRM processing.

The injection unit 116 drives a DRM engine for each application program for the control of the application program. For this, the injection unit 116 is driven together when a power is supplied to a system to perform an initial operation (for example, booting). The injection unit 116 monitors all application programs executed on an operating system (OS). And, in executing an application program, to which DRM is to be applied, the injection unit 116 drives the DRM engine to monitor input/output of a file. In this case, the injection unit 116 may include a list of application programs to which DRM is to be applied. However, for more flexible operation, the document rights management unit 118 may manage a list of application programs to which DRM is to be applied. And also, when an application program is driven, the injection unit 116 inquires of the document rights management unit 118 to confirm whether the corresponding application program is the application program to which DRM is to be applied. The apparatus for managing digital rights 100 according to the present invention may perform the management of digital rights regardless of kinds of application programs through this configuration, unlike existing apparatuses for managing digital rights which is only for each application program (for example, in the case of a Hangul program of Hancom, Inc., managing digital rights is performed using internal functions of the corresponding program).

The document rights management unit 118 manages a list of application programs to which DRM are to be applied, and manages rights information for each application program or document. The rights information corresponding to a certain application program may include temporary restriction information on rights of printing, storing, and modifying any document which is processed by the application program. The rights information corresponding to a document may include information on transmission, copy, and edit rights to the document. Various rights suitable for enterprise environments may be controlled through rights management by the document rights management unit 118.

The encryption/decryption unit 119 performs encryption and decryption on a document. The encryption/decryption unit 119 can be controlled by an encryption/decryption control unit 134 included in the kernel API hooking unit 130, and outputs the encryption and decryption results of the document to the encryption/decryption control unit 134.

The rights management unit 120 is an element for operating at the user level and performs access history management for DRM documents and user rights management for processing of documents, such as user authentication, modification, print, copy, and so on. For this, the rights management unit 120 includes a user authentication unit 122, a user rights management unit 124, and a use history management unit 126.

The user authentication unit 122 verifies a user right to a document or an application program on the basis of identification information on a user or a user terminal and outputs the result of user authentication. Also, the user rights management unit 124 processes matters associated with read, write, modification, capture, clipboard use, and print rights to a document on the basis of a result of user authentication. Accordingly, if the user right does not include the right of printing a document, the user rights management unit 124 does not perform instructions for printing the document by blocking a printing function of the application program. The use history management unit 126 manages a use history related to opening, modification, and storage of a DRM document. The use history management unit 126 is an element selectively included as necessary. Access to documents may be supported in other's computer using the user authentication described above, and logging information on document utilization (that is, open, storage, deletion, print, and capture) history may be correctly managed through use history management.

The kernel API hooking unit 130 hooks kernel native APIs to monitor input/output of a file, and on the basis of this, to control operations of the agent unit 110 and the rights management unit 120. The kernel native APIs are internally used on a windows operating system. The kernel native APIs of the windows operating system are classified with APIs starting as 'Nt' which can be used only in a kernel mode and APIs starting as 'Zw' which can be used in a user mode. The kernel native APIs are common regardless of application programs, and thus can perform DRM processing independently in application programs through the hooking. However, typical DRM management techniques using a kernel API hooking have a limitation due to the dependency on application programs in that API hooking is performed through reverse analysis of each application program and various APIs are used for input/output of a file.

For the DRM processing through the kernel native API hooking, the kernel API hooking unit 130 includes a rights control unit 132, an encryption/decryption control unit 134, and a cache processing unit 136. In this case, the cache processing unit 136 may be included as necessary.

The rights control unit 132 inquires of the document rights management unit 118 of the agent unit 110 and the user rights management unit 124 of the rights management 120 to confirm a right to the document corresponding to a file input/output event notified from the encryption/decryption control unit 134, and delivers the confirmation result to the encryption/decryption control unit 134 to control storage and decryption rights. At this point, the right control unit 132 inquires of the document rights management unit 118 whether temporary restriction of user rights is set according to rights policy received from the management server.

The encryption/decryption control unit 134 hooks the kernel native APIs to detect file input/output events. As described above, the apparatus for managing digital rights according to the present invention is driven for each application program to which DRM will be applied. Accordingly, the encryption/decryption control unit 134 may recognize the file input/output events, which are caused by an application program managed by the encryption/decryption control unit 134, among the kernel native API events. And also, the encryption/decryption control unit 134 inquires of the rights control unit 132 about rights to a document which is an object of the file input/output events, and according to the inquiry result, processes decryption, encryption, storage, and modification of the document. Furthermore, when the document is necessary to be decrypted (that is, the reading of the document is requested), the encryption/decryption control unit 134 inquires of the cache processing unit 136 whether the document has been previously decrypted. If the read-requested document is confirmed as having been already decrypted, the encryption/decryption control unit 134 receives the decrypted document from the cache processing unit 136 and provides the received document to the file input/output kernel native API. Unlike this, if the read-requested document is confirmed as having been not decrypted, the encryption/decryption control unit 134 requests the encryption/decryption unit 119 to decrypt the encrypted document, receives the decrypted document from the encryption/decryption control unit 134, and provides the received document to the file input/output kernel native API. When a kernel native API event occurs, such as clipboard copy, screen capture, or document print, the encryption/decryption control unit 134 provides the result, according to rights of the user or rights set to the document which are confirmed through the rights control unit 132, to the file input/output kernel native API It is described above that the encryption/decryption control unit 134 detects the file input/output kernel native API and returning the detection result as an example. Alternatively, the rights control unit 132 may detect the file input/output kernel native API, and the each corresponding element may return the result. As an example, in the case of document reading, if a read right to the read-requested document is confirmed, the rights control unit 132 requests the encryption/decryption control unit 134 to decrypt the document, and the encryption/decryption control unit 134 inquires of cache control unit 136 whether the document has been previously decrypted. If the document has been previously decrypted, the cache control unit 136 provides the decrypted document to the corresponding file input/output kernel native API directly or through the encryption/decryption control unit 134. Unlike this, if the document is confirmed as having been not decrypted, the encryption/decryption control unit 134 requests the encryption/decryption unit 119 to decrypt the encrypted document, receives the decrypted document from the encryption/decryption control unit 134, and provides the received document to the file input/output kernel native API.

If the file input/output kernel native API event corresponding to document writing, the encryption/decryption control unit 134 requests the encryption/decryption unit 119 to encrypt the document to be written. And then, the encryption/decryption control unit 134 receives the encrypted document received from the encryption/decryption unit 119, and provides the received document to the cache processing unit 136 such that the cache processing unit 136 can store the document. And also, the encryption/decryption control unit 134 provides the received document to the file input/output kernel native API. Where a file input/output kernel native API event corresponding to document modification is detected, the procedure related to file encryption is the same as the case of the document writing, but the procedure of confirming a document modifying right is add.

The cache processing unit 136 is an element for preventing an opened document from being encrypted or decrypted repeatedly. Accordingly, the cache processing unit 136 receives first encrypted or decrypted document from the encryption/decryption control unit 134 and stores the document in a built-in cache memory. If an inquiry whether the document to be processed has been decrypted is input from the encryption/decryption control unit 134, the cache processing unit 136 searches the cache memory, and then returns the document or outputs a signal of notifying that the document has been not decrypted to the encryption/decryption control unit 134.

Figure 2:
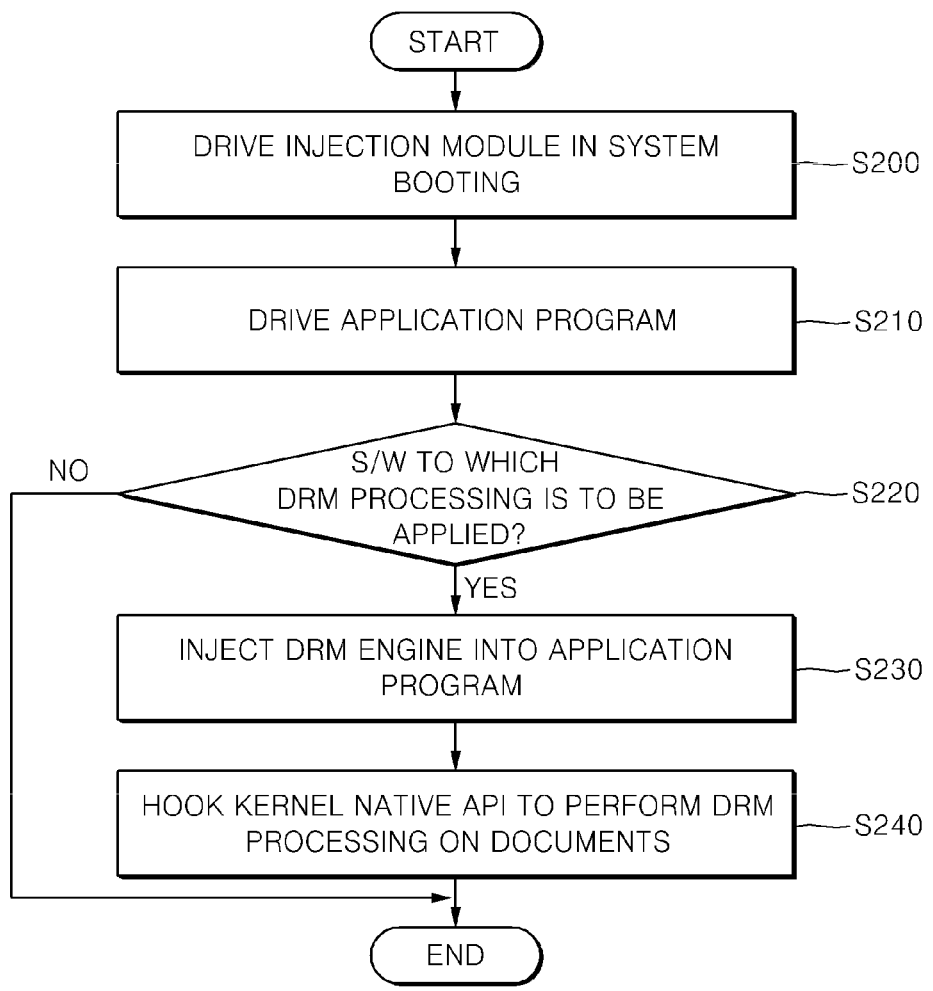
FIG. 2 is a flowchart illustrating a procedure of performing a method for managing digital rights according to an exemplary embodiment of the present invention.

FIG. 2 is a flowchart illustrating a procedure of performing a method for managing digital rights according to an exemplary embodiment of the present invention Referring to FIG. 2, in booting a system, an injection module is executed and monitors whether an application program is running (S200). At this time, the injection module monitors all application programs running on an OS (S210), and checks whether the running application program is a predetermined application program to which DRM is to be applied (S220). If the running application program is the predetermined application program to which DRM is to be applied, the injection module injects a DRM engine module, where a method for managing digital rights according to the present invention is implemented, into the application program (S230). The DRM engine module injected into the application program hooks kernel native APIs to perform DRM processing on documents (S240).

Figure 3:
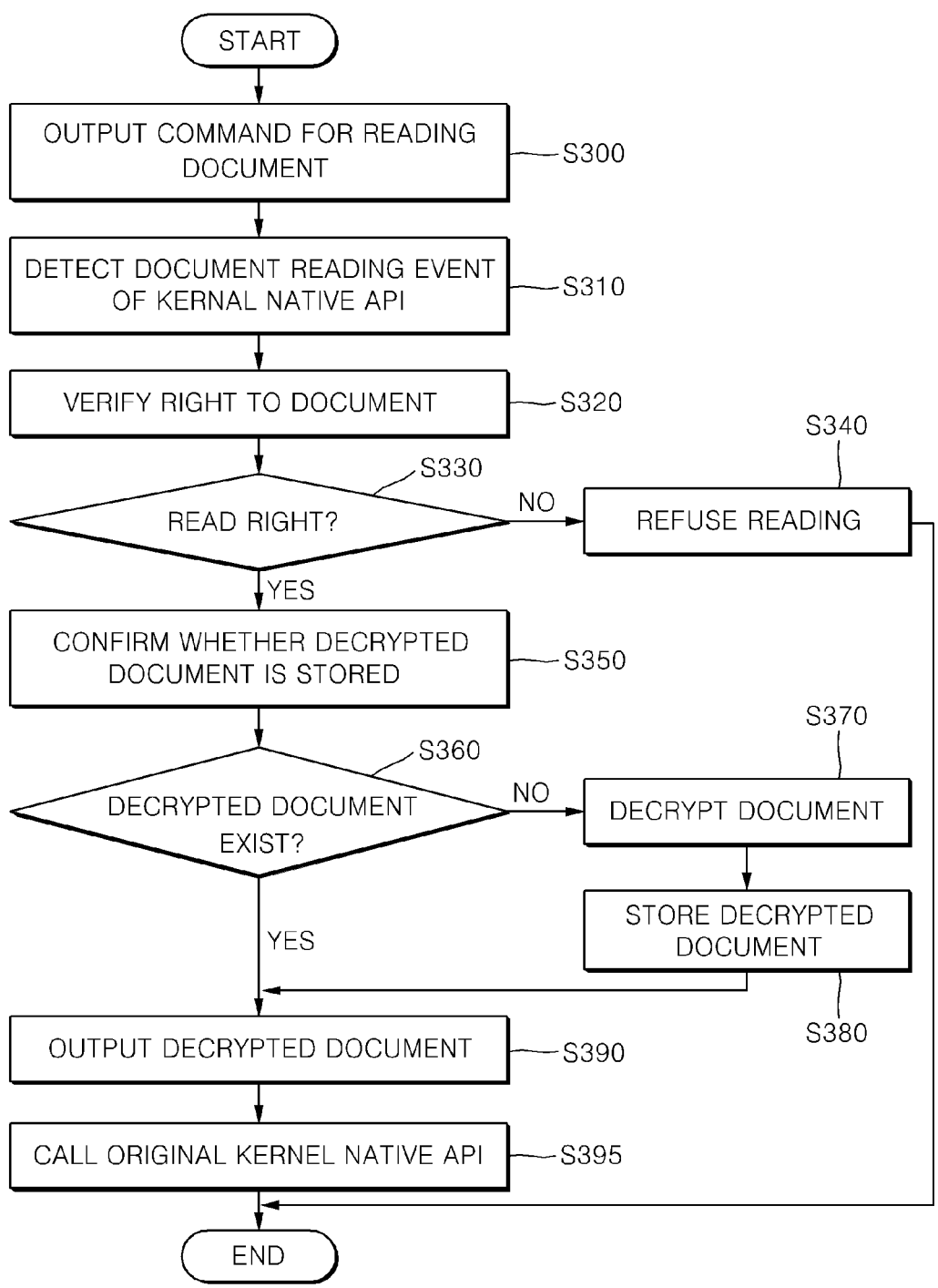
FIG. 3 is a flowchart illustrating a procedure of reading a document in a method for managing digital rights according to an exemplary embodiment of the present invention.

FIG. 3 is a flowchart illustrating a procedure of reading a document in a method for managing digital rights according to an exemplary embodiment of the present invention.

Referring to FIG. 3, a document reading command is output from an application program to which DRM is to be applied (S300). The DRM engine module monitors document reading events in the kernel native APIs (S310). Then, the DRM engine module checks whether a user has a right to the document (S320). If the user is confirmed as not having a right to read (S330), the DRM engine module blocks the document from being opened (S340). Unlike this, if the user is confirmed as having the right to read (S330), the DRM engine checks whether the document has been previously decrypted (S350). If the decrypted document is not confirmed as existing (S360), the DRM engine module decrypts the document (S370) and stores the decrypted document in the cache memory (S380). And then, the DRM engine module calls an original kernel native API and delivers the decrypted document (S395). Unlike this, if the decrypted document is confirmed as existing (S360), the DRM engine module does not perform a new decryption process, but directly call the original kernel native API and delivers the stored document.

Figure 4:
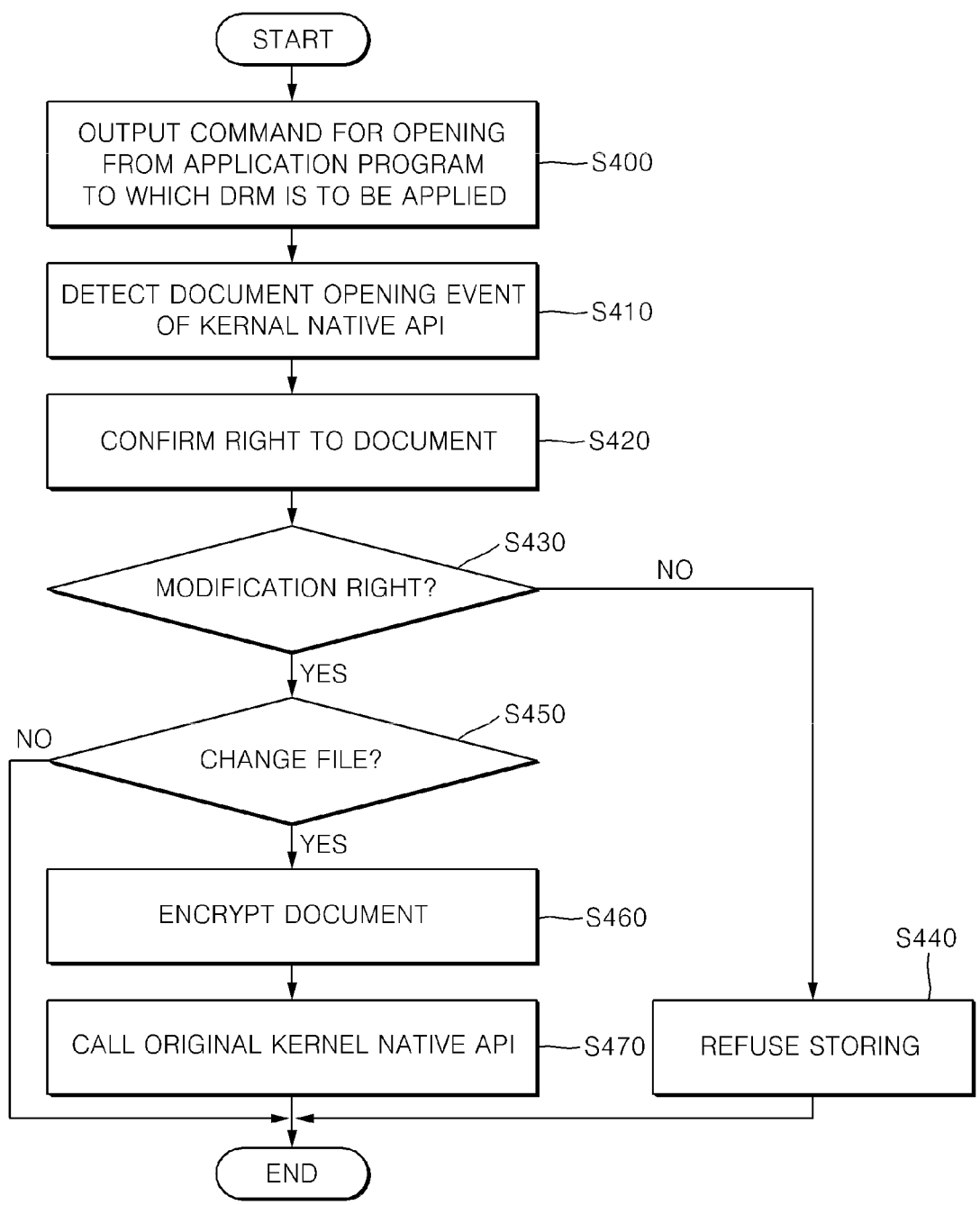
FIG. 4 is a flowchart illustrating a procedure of writing a document in a method for managing digital rights according to an exemplary embodiment of the present invention.

FIG. 4 is a flowchart illustrating a procedure of writing a document in a method for managing digital rights according to an exemplary embodiment of the present invention.

Referring to FIG. 4, a document opening command is output from an application program to which DRM is to be applied (S400). The DRM engine module monitors document opening events in the kernel native APIs (S410). Then, the DRM engine module checks whether a user has a right to the document (S420). If the user is not confirmed as having a modification right to the document (S430), the DRM engine module blocks the documents from being stored (S440). Unlike this, if the user is confirmed as having the modification right (S430), the DRM engine checks whether the document has been changed (S450). If the document is confirmed as having been changed, the DRM engine module encrypts the document (S460). In this process, the DRM engine module may store the encrypted document in the cache memory according to settings. Finally, The DRM engine module calls an original kernel native API and delivers the encrypted document (S470).

Figure 5:
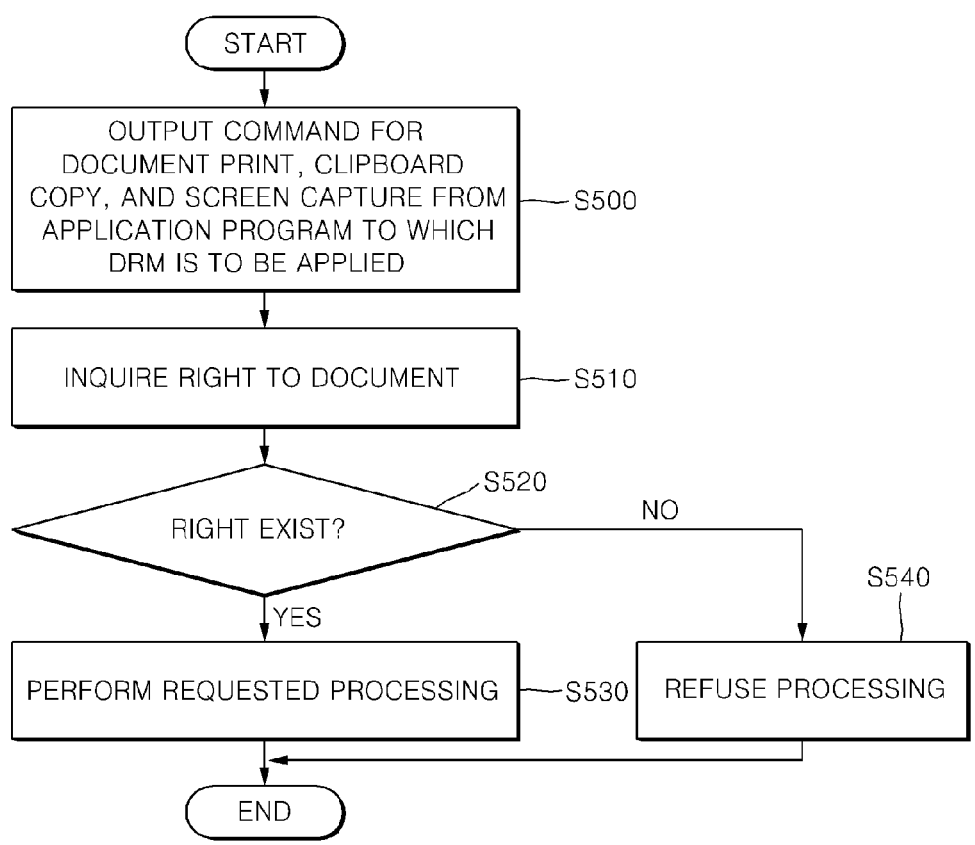
FIG. 5 is a flowchart illustrating a procedure of performing document print, clip board copy, and screen capture in a method for managing digital rights according to an exemplary embodiment of the present invention.

FIG. 5 is a flowchart illustrating a procedure of performing document print, clip board copy, and screen capture in a method for managing digital rights according to an exemplary embodiment of the present invention.

Referring to FIG. 5, when an execution command such as document print, clipboard copy, screen capture is output from an application program to which DRM is to be applied (S500), the DRM engine module checks which rights are set for the document (S510). In this case, the print right and clipboard copy right is included in user rights, and the screen capture right is included in document rights. If the right to the execution command (for example, clipboard copy) is confirmed as being set for the document (S520), the DRM engine module permits requested processing (S530). Unlike this, if the right to the execution instruction is confirmed as not being set for the document (S520), the DRM engine module refuses requested processing (S540).

The method for managing digital rights according to an exemplary embodiment of the present invention with reference to FIGS. 2 to 5 may be performed on the apparatus for managing digital rights according to an exemplary embodiment of the present invention with reference to FIG. 1. In this case, the apparatus for managing digital rights according to the present invention functions as the DRM engine module. And also, the method for managing digital rights according to an exemplary embodiment of the present invention with reference to FIGS. 2 to 5 may be implemented in software. In this case, the DRM engine module is installed in a target system as a program, and injected into an application program to which DRM is to be applied, by the injection module included in the DRM engine module.

Using the apparatus and method for managing digital rights according to the present invention as described above, DRM processing can be performed on all application programs, thus immediately responding to electronic file leakage and applying DRM to electronic files of various formats. And also, since DLLs required for the injection of a specific application program do not exist separately, the size of the engine can be reduced, thus using a storage medium efficiently. Furthermore, at the kernel level, control and DRM processing are performed, but the control and request of the only DRM processing are performed, thereby reducing processing processes to minimize unnecessary resource occupancy. Accordingly, although applying DRM, stability may be enhanced without a computer being slow. Compared with existing DRM techniques, a comfortable computer environment can be provided due to speed enhancement by 40% or more and kernel level operation stability. And also, a company introducing DRM can enlarge a range of application programs to which DRM is to be applied without additional module development cost, thus effectively reducing the cost.

The apparatus and method for managing digital rights according to the present invention can prevent decryption in information technology leakage and allow only authorized people to use the corresponding document, using DRM processing, such as user rights and encryption, on electronic documents or assets with electronic file format corresponding to the electronic document, in response to increasing private information, confidential information asset, and industrial technology leakages and developing hacking and information leakage techniques. The present invention is not dependent on a specific application program, thus performing DRM processing on new products or versions of all application programs and immediately responding to the leakage of electronic documents. Furthermore, limitation in application programs to which DRM is to be applied is minimized, thereby widely expanding application range of DRM, compared with existing methods.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

The present invention has been particularly shown and described with reference to preferred embodiments thereof. The invention should not be construed as being limited to the embodiments set forth herein. It will be understood by a person skilled in the art that various changes in form and details may be made therein without departing from the spirit and scope of the present invention as defined by the following claims.

What is claimed is:

1. An apparatus for managing digital rights, the apparatus comprising:
    a computer hardware processor executing application modules, the application modules comprising:
        an agent unit configured to manage application programs to which DRM is to be applied and a right to contents processed by the application programs to which DRM is to be applied and encrypt or decrypt the contents processed by the application programs to which DRM is to be applied;
        a rights management unit configured to authenticate a user and manage a user right to the contents processed by the application programs to which DRM is to be applied; and
        a kernel API hooking unit configured to monitor input/output of a file through hooking of kernel native APIs, request the rights management unit to verify a user right to contents to be processed when the contents are detected as being processed by the application programs to which DRM is to be applied, and request the agent unit to encrypt or decrypt the contents to be processed in response to verifying the user right to the contents to be processed,
    wherein the agent unit, the rights management unit, and the kernel API hooking unit are driven for each application program to which DRM is to be applied, and
    wherein the agent unit comprises:
        a user policy management unit configured to change rights of a user or rights to contents on the basis of rights information received from the user or a management server managing DRM policies;
        a document rights management unit configured to manage a list of application programs to which DRM is to be applied and manage rights information for each document and each application program to which DRM is to be applied;
        an injection unit configured to monitor application programs running on an operating system and drive the agent unit, the rights management unit, and the kernel API hooking unit for each application program in response to running of the application program to which DRM is to be applied; and
        an encryption/decryption unit configured to encrypt or decrypt the contents and return the encrypted or decrypted contents to the kernel API hooking unit in response to the request for encryption or decryption of the contents from the kernel API hooking unit,
    wherein the agent unit and the rights management unit operate in a user level and the kernel API hooking unit operates in a kernel level.

2. The apparatus of claim 1, wherein the rights information received from the management server comprises rights information for each content or application program to which DRM is to be applied, information on the application programs to which DRM is to be applied, and information on allowance/limitation/change of the user right.

3. The apparatus of claim 1, wherein, in response to detecting that an application program is running, the injection unit is configured to inquire of the document rights management unit whether the running application program is the application program to which DRM is to be applied.

4. The apparatus of claim 1, wherein the rights management unit comprises:
    a user authentication unit configured to verify the user right to the contents or the application programs to which DRM is to be applied and output an authentication result on the user; and
    a user rights management unit configured to manage the user rights to read, write, modification, capture, clipboard use, and print on the basis of the authentication result on the user and return a verification result in response to a request for verifying of the right to the contents to be processed from the kernel API hooking unit.

5. The apparatus of claim 4, wherein the rights management unit further comprises a use history management unit configured to manage a use history including opening, modification, and storage of the contents to which DRM is applied.

6. The apparatus of claim 1, wherein the kernel API hooking unit comprises:
    a rights control unit configured to request the agent unit and the rights management unit to verify the user right to the contents corresponding to file input/output events and outputting the verification result; and
    an encryption/decryption control unit configured to hook the kernel native APIs to detect the file input/output events, request the rights management unit to verify the user right to the contents to be processed corresponding to the file input/output events, and deliver the contents to be processed to the agent unit to direct encryption or decryption on the basis of the verification result.

7. The apparatus of claim 1, wherein the kernel API hooking unit comprises:
    a rights control unit configured to hook the kernel native APIs to detect file input/output events, request the agent unit and the rights management unit to verify the user right to the contents to be processed corresponding to the detected file input/output events, and output the verification result; and
    an encryption/decryption control unit configured to deliver the contents to be processed to the agent unit on the basis of the verification result to direct encryption or decryption.

8. An apparatus for managing digital rights, the apparatus comprising:
    a computer hardware processor executing application modules, the application modules comprising:
        an agent unit configured to manage application programs to which DRM is to be applied and a right to contents processed by the application programs to which DRM is to be applied and encrypt or decrypt the contents processed by the application programs to which DRM is to be applied;
        a rights management unit configured to authenticate a user and manage a user right to the contents processed by the application programs to which DRM is to be applied; and
        a kernel API hooking unit configured to monitor input/output of a file through hooking of kernel native APIs, request the rights management unit to verify a user right to contents to be processed when the contents are detected as being processed by the application programs to which DRM is to be applied, and request the agent unit to encrypt or decrypt the contents to be processed in response to verifying the user right to the contents to be processed, wherein the agent unit, the rights management unit, and the kernel API hooking unit are driven for each application program to which DRM is to be applied, and wherein the kernel API hooking unit comprises:

a rights control unit configured to request the agent unit and the rights management unit to verify the user right to the contents corresponding to file input/output events and outputting the verification result;

an encryption/decryption control unit configured to hook the kernel native APIs to detect the file input/output events, request the rights management unit to verify the user right to the contents to be processed corresponding to the file input/output events, and deliver the contents to be processed to the agent unit to direct encryption or decryption on the basis of the verification result; and a cache processing unit configured to receive previously encrypted or decrypted contents from the encryption/decryption control unit and store the contents in a built-in cache memory, thereby preventing an opened document from being encrypted or decrypted repeatedly, and in response to an inquiry whether the contents to be processed have been encrypted or decrypted being input from the encryption/decryption control unit, is configured to search the cache memory and return the contents or output a notification that the contents has been not decrypted.

9. An apparatus for managing digital rights, the apparatus comprising:

a computer hardware processor executing application modules, the application modules comprising:

an agent unit configured to manage application programs to which DRM is to be applied and a right to contents processed by the application programs to which DRM is to be applied and encrypt or decrypt the contents processed by the application programs to which DRM is to be applied;

a rights management unit configured to authenticate a user and manage a user right to the contents processed by the application programs to which DRM is to be applied; and a kernel API hooking unit configured to monitor input/output of a file through hooking of kernel native APIs, request the rights management unit to verify a user right to contents to be processed when the contents are detected as being processed by the application programs to which DRM is to be applied, and request the agent unit to encrypt or decrypt the contents to be processed in response to verifying the user right to the contents to be processed, wherein the agent unit, the rights management unit, and the kernel API hooking unit are driven for each application program to which DRM is to be applied, and wherein the kernel API hooking unit comprises:

a rights control unit configured to hook the kernel native APIs to detect file input/output events, request the agent unit and the rights management unit to verify the user right to the contents to be processed corresponding to the detected file input/output events, and output the verification result;

an encryption/decryption control unit configured to deliver the contents to be processed to the agent unit on the basis of the verification result to direct encryption or decryption; and a cache processing unit configured to receive previously encrypted or decrypted contents from the encryption/decryption control unit and store the contents in a built-in cache memory, thereby preventing an opened document from being encrypted or decrypted repeatedly, and in response to an inquiry whether the contents to be processed have been encrypted or decrypted being input from the encryption/decryption control unit, searches the cache memory and returns the contents or outputs a notification that the contents has been not decrypted.

10. A method for managing digital rights, the method comprising:

(a) injecting a DRM engine module into an application program to which DRM is to be applied when the application program to which DRM is to be applied is driven;

(b) monitoring input/output of a file, using a processor, through hooking a kernel native API, and when a content is detected as being processed by the application program to which DRM is to be applied, verifying, using a processor, a user right to the content to be processed in the application program to which DRM is to be applied;

(c) selectively encrypting or decrypting the content to be processed when the user right to the content to be processed is verified; and (d) returning the encrypted or decrypted content to the kernel native API, wherein step (a) and step (c) are performed at user level, and step (b) and step (d) are performed at kernel level, and wherein step (c) comprises:

(c1) hooking the kernel native API to detect a file input/output event;

(c2) verifying, using a processor, the user right to the content to be processed corresponding to the file input/output event, authenticating the user, and managing the user right to the content to be processed in the application program to which DRM is to be applied; and (c3) encrypting or decrypting the content on the basis of the verification result.

11. The method of claim 10, wherein step (a) comprises injecting the DRM engine module into the detected application program, when the detected application program is in a predetermined list of application programs to which DRM is to be applied.

12. The method of claim 10, wherein the right of the user or the right set to the content is changeable on the basis of rights information received from the user or a management server managing DRM policies.

13. The method of claim 12, wherein the rights information received from the management server comprises rights information for each content or application program to which DRM is to be applied, information on the application program to which DRM is to be applied, and information on allowance/limitation/change of the user right.

14. The method of claim 10, further comprising (e) updating a use history which includes opening, modification, and storage of the content to which DRM is applied.

15. The method of claim 10, wherein step (c) further comprises (c4) searching a cache memory which stores previously encrypted or decrypted contents and reading out the content, thereby preventing the content from being encrypted or decrypted repeatedly.

16. A non-transitory computer readable medium storing a program for executing the method for managing digital rights according to claim 10 in a computer.

* * * * *